Aug. 1, 1967  E. P. BULLARD III, ET AL  3,333,493
PRESET TOOLING
Original Filed April 30, 1963  3 Sheets-Sheet 3

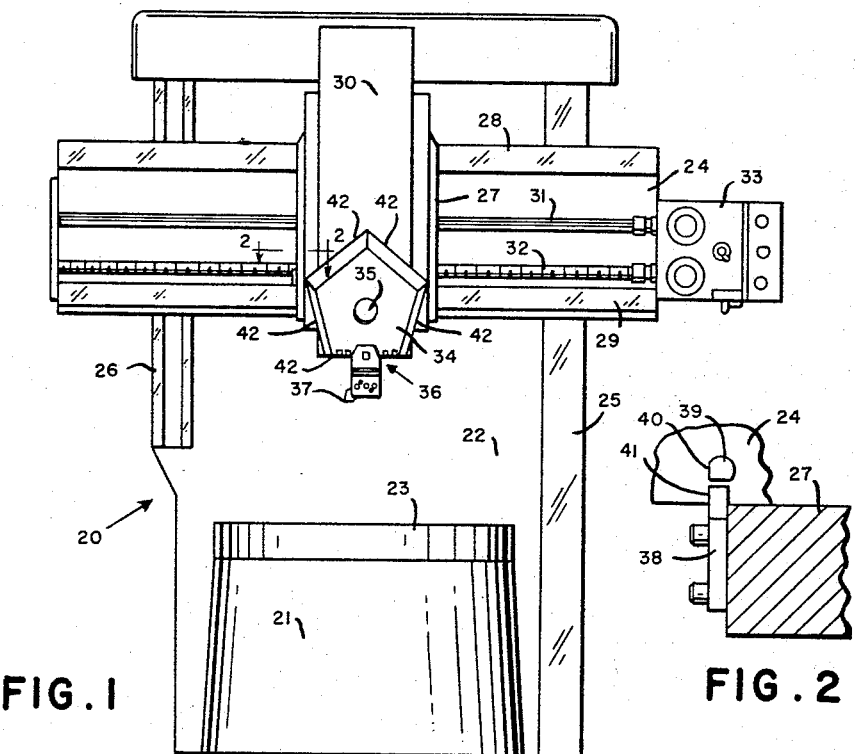
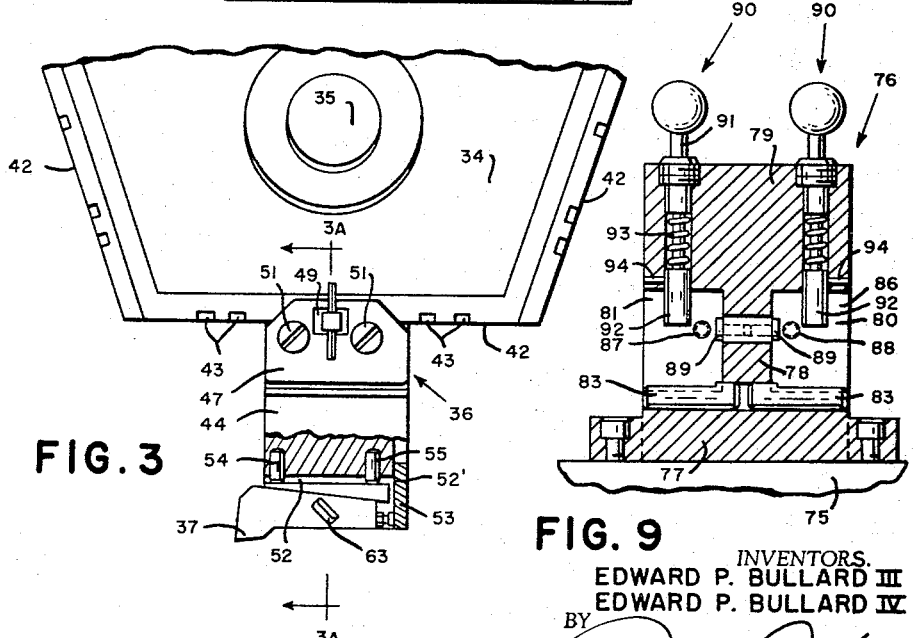

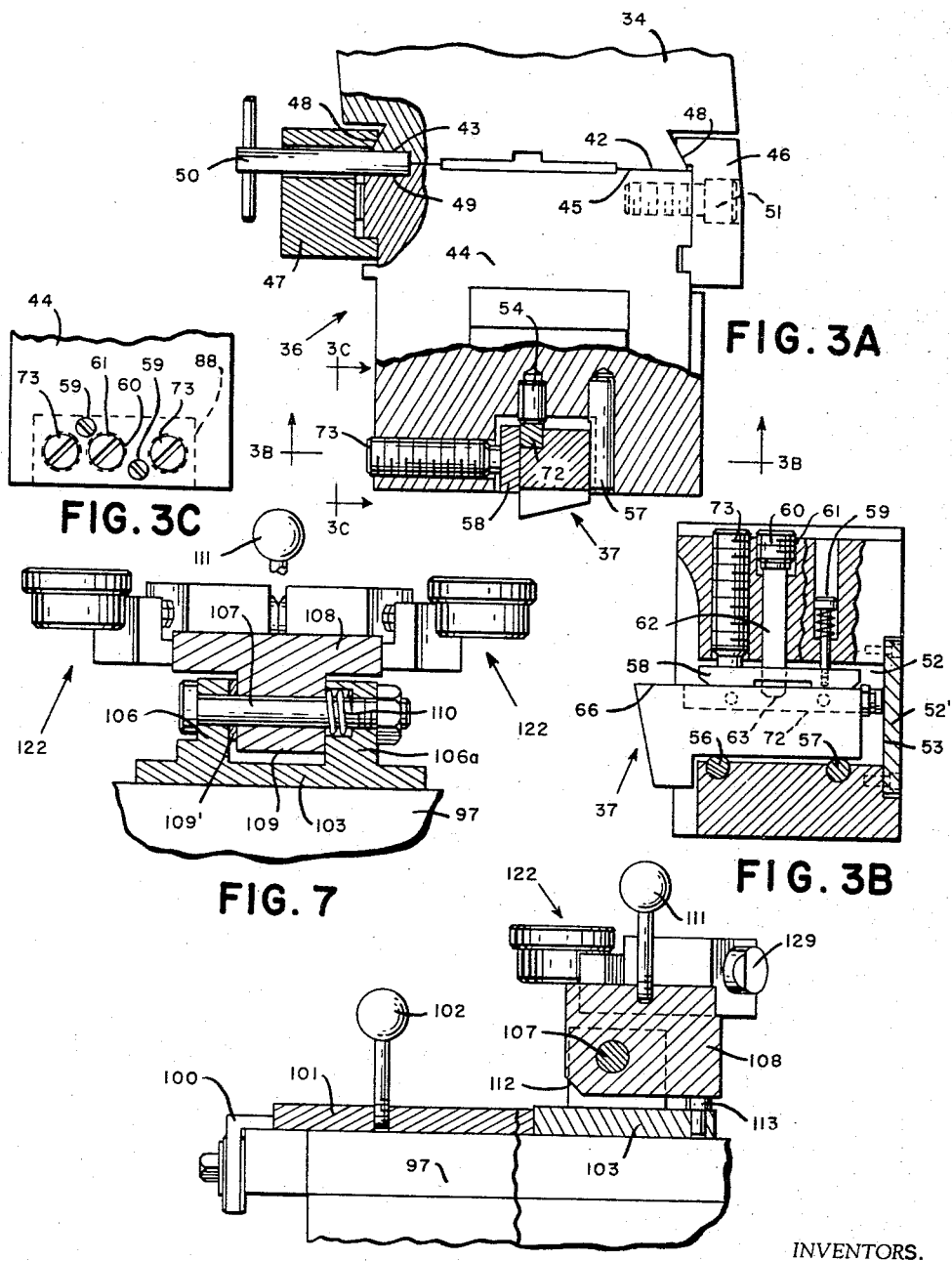

INVENTORS.
EDWARD P. BULLARD III
EDWARD P. BULLARD IV
BY Paul M. Grist
ATTORNEY.

United States Patent Office 3,333,493
Patented Aug. 1, 1967

3,333,493
PRESET TOOLING
Edward P. Bullard III, Fairfield, and Edward P. Bullard IV, Westport, Conn., assignors to The Bullard Company, Bridgeport, Conn., a corporation of Connecticut
Original application Apr. 30, 1963, Ser. No. 276,826, now Patent No. 3,252,202, dated May 24, 1966. Divided and this application May 21, 1965, Ser. No. 457,659
4 Claims. (Cl. 82—36)

The present invention relates to machine tools and particularly to an improved method of, and apparatus for, presetting tools for use with machine tools.

This is a division of application Ser. No. 276,826, filed Apr. 30, 1963, now Patent No. 3,252,202, in the name of Edward P. Bullard III and Edward P. Bullard IV.

With the increased use of automatic controls in industry such as intermittent program controls, one form of which is known as numerical tape control, it has become necessary to develop preset tooling in order to keep the machine and such controls operating continuously and productivity. Particularly is present tooling necessary for machine tools which remove metal with a tool or tools in transit, such as lathes and the like as distinguished from moving a tool through air to a fixed, preselected point at which the cutting then takes place.

The principal object of the present invention is to provide a method of, and apparatus for, presetting tools for use with machine tools.

Another object of the invention is to provide such a method and apparatus in which the tools can be preset away from the machine tool, thus reducing the time required for an operator to start a production run.

Still another object of the invention is to provide such a method of, and apparatus for, presetting tools that will eliminate trial cuts.

Still another object of the invention is to provide such a method of, and apparatus for, presetting tools that will complement the use of numerical tape control.

Although the principles of the invention can be applied with equal facility to other types of machine tools, they have been shown and will be described as applied to a vertical turret lathe.

In one aspect of the invention, the turret faces are precisely machined relative to the axis of rotation of the turret, and very accurately formed keyways are provided at identically spaced locations along each turret face, one in the center thereof and two on each side of the center keyway.

In another aspect of the invention, mating indicating means are located on the saddle supporting the turret as well as on the cross rail that supports the saddle. The construction is such that when aligned, the centerline of the turret axis of rotation is exactly aligned with the axis of rotation of the work supporting table of the lathe.

In still another aspect of the invention, tool holders may be provided for attachment to the accurately machined turret faces by key means that may register with any of the accurately formed keyways therealong, depending upon the best location of the tool for the work to be performed.

In still another aspect of the invention, the tool holders may include very accurate vertical and horizontal locating means. Adjustable preset means may be provided on a tool which cooperate with the locating means on the tool holder such that an accurate predetermined dimension will be established between the cutting edge or point of the tool and the axis of rotation of the turret, and consequently the axis of rotation of the work supporting table when the indicating means on the saddle and cross rail are aligned.

In still another aspect of the invention, the cutting edge or point of the preset tool when mounted in the tool holder is at a fixed vertical point from the accurately machined turret face and at a fixed horizontal point from the vertical locating means on the tool support. A horizontal datum line may be established (usually at an elevation above the table that is lower than the lowest point to which the cutting tool is to be moved in performing the desired work). A vertical datum line, usually located to the left of the lathe table, may also be established. These lines may be employed for numerical tape control measurements so that all measurements from them to the tool cutting tip are of a positive nature. Accordingly, when a tool holder is attached to any turret face by a key in the central keyway thereof, and with the indicating means on the saddle and cross rail aligned, the cutting edge or point of the tool will always be at a precise location from the horizontal and vertical datum lines, from which lines all measurements may be made. Of course, if a tool holder is attached to a turret face by a key within one of the keyways on each side of the central one, the tape programmer must add to, or subtract from, this numerical input data a corresponding value.

In a still further aspect of the invention, each tool may include a slidably adjustable tapered gib construction for vertically adjusting the cutting edge or point of the tool, and a threaded nut means may be provided for effecting horizontal adjustment of said tool point.

In still another aspect of the invention, a number of so-called master tools may be constructed, each adapted for a particular type of cutting operation, such as a left, a right, an upturning lefthand, a downturning lefthand, an undercutting righthand, an undercutting lefthand, etc., type of tool. These master tools may be accurately set so that a distance from their cutting tip to their rear end is a precise dimension; and, the dimension from their cutting tip to one surface of their shank is also a precise dimension.

In still another aspect of the invention, a fixture may be provided for accommodating the various master tools. It may include gauges having plungers arranged at right angles which are so designed that the free ends of the plungers abut, forming a right angular notch adapted to receive the cutting tip of the master tools.

Accordingly, by mounting a master tool within the fixture so that its cutting tip just contacts the abutting gauge surfaces (slightly moving them), the gauge dials can be adjusted to read zero-zero. Then, when a corresponding production tool has been sharpened and requires resetting, it is only necessary to mount it in the fixture (after removing the master) and set its vertical and horizontal adjusting means so that the gauges read zero-zero. It is then in condition to be reinserted in the tool holder on the machine to continue the production run.

The above, other objects and novel features of the invention will become apparent from the following specification and accompanying drawings which are merely exemplary.

In the drawings:

FIG. 1 is a front elevational view of a vertical turret lathe to which the principles of the invention have been applied;

FIG. 2 is a sectional view taken substantially along line 2—2 of FIG. 1;

FIG. 3 is an enlarged partial sectional view of the turret on the machine of FIG. 1;

FIG. 3A is a sectional view taken substantially along line 3A—3A of FIG. 3;

FIG. 3B is a sectional view taken substantially along line 3B—3B of FIG. 3A;

FIG. 3C is a fragmentary view taken substantially along line 3C—3C of FIG. 3A;

FIG. 4 is a plan view of a fixture to which the principles of the invention have been applied;

FIG. 5 is a sectional view taken substantially along line 5—5 of FIG. 4;

FIG. 6 is a sectional view taken substantially along line 6—6 of FIG. 4;

FIG. 7 is a sectional view taken substantially along line 7—7 of FIG. 4;

FIG. 8 is a sectional vew taken substantially along line 8—8 of FIG. 4;

FIG. 9 is a sectional view taken substantially along line 9—9 of FIG. 4;

FIGS. 10, 11 and 12 are views of master tools to which the principles of the invention have been applied;

FIG. 13 is a sectional view of a master boring bar; and

FIG. 14 is a view looking in the direction of the arrows along line 14—14 of FIG. 13.

Referring to the drawings, and particularly to FIG. 1, the principles of the invention are shown as applied to a vertical turret lathe, although they can with equal facility be applied to other machine tools. The vertical turret lathe shown may comprise a base casting 20 including a barrel 21 and an integrally connected column 22. The barrel 21 may support a table 23 that is adapted to be rotated by a headstock transmission (not shown) as is well known. A cross rail 24 may be mounted on ways 25 and 26 on bed 22 for vertical movement therealong. A saddle 27 may be mounted on ways 28, 29 on the cross rail for horizontal reciprocation thereaong. A slide 30 may be mounted between ways on the saddle 27 for vertical reciprocation. A splined shaft 31 and screw 32 may be rotated in opposite directions for moving the saddle and slide along their paths of travel by a feedworks transmission 33, all in a manner well known in the art.

A multi-sided turret 34 may be mounted on a pin 35 and be capable of being indexed so that each face thereof is in a horizontal plane, presenting a tool holder 36 that supports a tool 37 in position to perform a working operation on a workpiece held by table 23 as the latter rotates.

Referring to FIG. 2, the saddle may be provided with a gauge 38 bolted to its one side for cooperation with a pin 39 within the cross rail 24. The pin 39 and gauge 38 have accurately ground surfaces 40, 41 that can be aligned by movement of the saddle along the cross rail. When aligned, the centerline of the axis of rotation of the turret 34 is in precise alignment with the axis of rotation of the table 23.

Referring to FIG. 3, the turret 34 may be provided with very accurately machined surfaces 42 that are a precise, identical dimension from the centerline of pin 35 which is the axis of rotation of the turret 34. Keyways 43 at the center, and on each side of the center, of surfaces 42 may be provided for accurately locating the tool supports 36 along the turret faces. Referring to FIGS. 3 and 3A, tool support 36 may comprise a body member 44 having an accurately machined surface 45 adapted to contact the surface 42 of the turret 34. Clamping blocks 46 and 47 may be provided which include tapered surfaces 48 adapted to cooperate with tapered grooves along the front and back of the turret 34. Also, each support includes a keyway 49 which, when aligned with a keyway 43, enables a key 50 to be inserted therein to insure accurate positioning of the support along the turret face prior to tightening cap screws 51 that extend through clamping blocks 46 and 47 to securely hold the tool support to the turret face.

Tool holder 36 may also include a tool receiving passage 52, open at one end and closed at the other end by a plate 52' having a surface 53 that is precisely spaced from the center of the keyway 49. The holder 36 may also include a pair of pins 54, 55 (FIG. 3) having their exposed ends machined to a precise dimension from the surface 42. In order to support a tool 37 in passage 52 of the holder 36, a pair of spaced pins 56, 57 is embedded in the surface normal to the surface 53 of plate 52' (FIG. 3B). Additionally, shoe means 58 may be attached to resilient means 59. The tool 37 rests on pins 56, 57, and shoe 58 rests on an opposite surface thereof. A cam member 60 having a threaded portion 61 and a finger portion 62 is threaded into a hole in holder 36, and the lower end of finger 62 is adapted to cooperate with a cam recess 63 in one face of tool 37 for a purpose to be described later.

The tool 37 (FIG. 10) may include a shank portion 64 having a screw 65 threaded into its end opposite that of cutting tip 66. A lock nut 67 may be provided for locking screw 65 in longitudinally adjusted position. A tapered gib 68 may be mounted on one face of shank 64 by screws 69 that pass through elongated holes 70, 71. Accordingly, the cutting point of tip 66 can be accurately set relative to the surface 72 of gib 68 and the exposed head of screw 65.

The cam recess 63 includes a cam surface 63A that lies along a line that forms a right triangle with lines coincident with the abutting surface of the head of screw 65 and the surface 72 of the gib 68 and which cam surface 63A is inclined transversely inwardly of shank 64 and toward cutting tip 66. Accordingly, with a tool such as shown in FIG. 10 in passage 52, cam means 60 can be screwed into support 36, causing finger 62 to engage cam recess 63, forcing tool 37 in a direction such that the exposed end of screw 65 engages surface 53 of plate 52', and surface 72 of gib 68 contacts the exposed ends of pins 54, 55. With the tool 37 thus in place in support 36, screws 73 can be tightened so as to force the shoe 58 into clamping engagement with the tool 37. Referring to FIG. 3C, there are two screws 73 and two mounting means 59 that cooperate with the shoe 58.

Referring to FIGS. 4 to 9, inclusive and particularly to FIG. 4, in order to preset tools for use with the tool holder or support 36, a fixture 74 is provided. Fixture 74 may comprise a plate 75 on which may be mounted a double tool block 76, each half of which possesses parts substantially identical with those of support 36. Thus, block 76 may comprise a casting having a base 77 and a centrally disposed partition wall 78 that supports a head piece 79. The wall 78 produces pockets 80, 81 on each side of wall 78, and pins 82, 83 may be embedded in the bottom wall of pockets 80, 81 with their top surfaces accurately machined to provide a locating means for a tool shank. A plate 86 may be attached to head piece 79 and it acts as an accurate locating surface in the same manner as does plate 52 (FIG. 3).

Set screws 87, 88 may extend through plate 86, and accurately machined pins 89 may be provided on opposite faces of wall 78, all for accurately locating a tool shank.

Head 79 may also support cam means 90 on each side of wall 78, each cam means comprising a reciprocable plunger 91 having a cam end 92 that is normally urged downwardly by a spring 93. A pin 94 fixed to plunger 91 cooperates with an elongated slot 95 in the end 92, and a cam surface 96 on the end 92 cooperates with recess cam 63 in the shank of a tool (FIG. 10). The construction and arrangement are such that plunger 91 may be lifted upwardly and a tool 37 inserted within one of the spaces 80, 81 so that the tapered gib 68 is in position to locate on pins 89 and the head of screw 65 to locate on screw 87. Releasing plunger 91 causes cam surface 96 to be received within recess 63 to force the exposed side surface of gib 68 into engagement with pins 89 and the head of screw 65 into engagement with screw 87.

Referring again to FIG. 4, an indicating mechanism 97 may also be mounted on plate 75. It may comprise a magnetic chuck or other suitable holding device 98 that is held to plate 75 by screws 99. The magnetic chuck 97 may include a guide 100 along one side thereof, and along which a triangular ferrous metal plate 101, supported by the face of chuck 97, may slide. A handle 102 may be attached to plate 101 for facilitating its sliding along the face of chuck 97 and guide 100. Another plate of ferrous metal 103, having a 45° edge 104, is adapted to cooperate with a 45° surface 105 of plate 101, and it may include spaced, parallel ears 106 and 106A (FIG. 7). A bolt 107 extending between ears 106, 106A may pivotally support a table element 108 through a depending tongue 109 that is located between said ears. A friction element 109' cooperates with one face of tongue 109, and a spring 110 acting on the other face of tongue 109 restricts the movement of table 108 for a purpose to be described later. Referring to FIG. 8, the table 108 may include a handle 111 for pivoting it about bolt 107, and a chamfered edge 112 on table 108 is adapted to abut plate 103 to restrict its pivotal movement in one direction, while accurately machined buttons 113 in plate 103 restrict its pivotal movement in the other direction.

The table 108 may include right angular edges 114, 115 along with identical indicating machanisms 116 may be rigidly secured by bolts 117 (FIG. 6). Each indicating mechanism 116 may comprise a frame 118 having axially aligned bores 119, 120, in the latter of which the plunger end 121 of an indicator gauge 122 may be rigidly secured. The bore 119 receives a plunger 123 that extends through bushings 124, 125 in bore 119. The rear end of plunger 123 is threaded and supports locking nuts 126, while the forward end includes an enlarged section 127. A spring 128 within bore 119 acts between the rear bushing 124 and the enlarged section 127, urging the plunger forwardly and in a direction away from the plunger of gauge 122. The forward end of section 127 supports a head 129 having a 45° surface 130 that cooperates with a corresponding surface of the plunger of the indicating mechanism attached to the edge 115 of table 108. The two heads, with their cooperating 45° surfaces, provide an exact locating means for the cutting tip of a tool.

As previously described, a tool such as shown in FIG. 10 embodying certain of the principles of the invention may be accurately set so that the cutting point thereof is at an exact distance from surface 72 of gib 68 and the exposed head of screw 65. Such a preset tool may be employed as a master having known dimensions N and C which dimensions provide indication of the exact location of the tool cutting tip when the tool is mounted in the tool holder 36 on turret 34. Accordingly, with such a master tool held within the passage or pocket 80 (FIG. 4) by the cam surface 96 cooperating with recess 63, and the magnetic chuck 97 de-energized, the plates 101 and 103 with their 45° edges 104, 105 in contact may be slid along chuck 97 until the heads 129 on indicating mechanism 116 contact the cutting edge of the tool and slightly depress the plungers 123 thereof to provide a positive reading on the dials of gauges 122. The dials are then set to read zero and the chuck 97 is energized. Table 108 may then be pivoted so that its chamfered edge 112 abuts plate 103, and the master tool may be removed and stored in a safe place.

When a production tool 37 that is constructed exactly like the master has become worn and/or requires replacement of the cutting tip, it is inserted in the passage 80 and held therein by plunger 91. The table 108 is pivoted about bolt 107 until it engages stops 113. With the set screws 69 of the tool 37 loosened, the screw 88 (FIG. 4) is adjusted until the plunger for the gauge 122 on the side 115 of table 108 reads zero, at which time screws 69 are tightened. The lock nut 67 is loosened and screw 65 adjusted until the dial of gauge 122 on edge 114 of table 108 reads zero, whereupon lock nut 67 is tightened. Table 108 is then pivoted away from its position as shown in FIG. 4, and the re-set tool is removed from passage 80 and is stored preparatory to being used as a production tool.

There may be any number of different type master tools and identical production tools for different types of cutting action, which tools may have basic dimensions different from those of the tool shown in FIG. 10. Thus, the tool shown in FIG. 11 has its cutting tip directed oppositely to that of the tool of FIG. 10, and its basic dimensions N' and C' are different from N and C of FIG. 10. When the tool of FIG. 11 is held within the passage 80, plates 101 and 103 are reversed so that the edge 131 of plate 101 slides along guide 100, thus locating the heads 129 so as to accommodate the cutting tip 132 of the tool shown in FIG. 11. In this position of plates 101, 103, a tool having a tip 133 may be held in passage 81 and reset to correspond with its master.

In order to preset boring bars, a bearing 134 may be fixed to base 75. It may include a lower member having a semicylindrical surface that supports a cap 135 having a semicylindrical surface that forms with the lower member a cylindrical journal adapted slidingly to receive the shank 136 of a boring bar 137. The shank 136 includes a threaded portion 138 which threadingly receives a collar 139 having an accurate surface 139A adapted to abut against a face surface 140 of bearing 134.

The forward end of the bar 136 may include an angularly disposed passage 141 for the reception of a cutting bit 142. Referring to FIGS. 13 and 14, a master boring bar 145 may comprise a sleeve 146 having a flange 147. The sleeve 146 is adapted slidingly to be received within the bearing 134, and the surface 148 of flange 147 is adapted to register with the surface 140 of bearing 134. A bar 149 may be slidingly mounted within sleeve 146 and adjustably locked by a set screw 150. Bar 149 may include an indexing head 151 having notches 152 about its periphery forming points 153 that are at precise dimensions from the longitudinal axis of bar 149. The bar may be adjusted by gauge means such that a precise predetermined dimension exists between surface 148 and the face 154 of head 151. The head 151 may be indexed to a position where a precise dimension exists between one of the points 153 and the longitudinal axis of bar 149.

With the master 145 mounted in bearing 134, the gauge means 116 may be moved to cooperating position with the selected point 153 and locked there. The master 145 is replaced by the production bar 137 and adjusted so that the gauge means reads the same as it did with the master 145. The bar 137, when fixed to a face of the turret, will then have its cutting tip at a precise location from the turret face and a line that is normal to the face and passing through the rotational axis of the turret.

Although the various features of the preset tooling apparatus and method have been shown and described in detail to fully disclose several embodiments of the invention, it will be evident that changes may be made in such details and certain features may be used without others without departing from the principles of the invention.

What is claimed is:

1. Presettable tooling for a machine tool comprising in combination, a tool holder adapted to be attached to a head of a machine tool, said tool holder including a block having a pocket formed therein for receiving a preset tool; right angular locating surfaces forming walls of said pocket; a preset tool in said pocket, said tool having a shank with a cutting tip at one end; an adjustable abutting means at the end of said shank opposite said cutting tip; longitudinally movable, transversely adjustable means mounted on one side of said shank; a recess having a cam surface within another side of said shank; and a cam member in said block adapted to be received within said cam recess for forcing said preset tool along two axes and in a direction such that said abutting means and said transversely adjustable means engage said right angular locating surfaces.

2. Presettable tooling for a machine tool comprising in combination, a tool holder adapted to be attached to a head of a machine tool, said tool holder including a block having a pocket formed therein for receiving a preset tool; right angular locating surfaces forming walls of said pocket; a preset tool in said pocket, said tool having a shank with a cutting tip at one end; an adjustable abutting means at the end of said shank opposite said cutting tip; longitudinally movable, transversely adjustable means mounted on one side of said shank; a recess having a cam surface within another side of said shank; a cam member in said block adapted to be received within said cam recess for forcing said preset tool along two axes and in a direction such that said abutting means and said transversely adjustable means engage said right angular locating surfaces; shoe means resiliently held within said pocket and adapted to rest on a side of said shank; and screw means adapted to cooperate with said shoe means to rigidly hold said tool within said pocket.

3. Presettable tooling for a machine tool comprising in combination, a tool holder adapted to be attached to a head of a machine tool, said tool holder including a block having a pocket formed therein for receiving a preset tool; right angular locating surfaces forming walls of said pocket; a preset tool in said pocket, said tool having a shank with a cutting tip at one end; a bolt threaded into a threaded hole in the end of said shank opposite that supporting said cutting tip; a tapered gib longitudinally adjustably fixed on one side of said shank; a recess having a cam surface within another side of said shank; and a cam member in said block adapted to be received within said cam recess for forcing said preset tool along two axes and in a direction such that said bolt and said tapered gib engage said right angular locating surfaces.

4. Presettable tooling for a machine tool comprising in combination, a tool holder adapted to be attached to a head of a machine tool, said tool holder including a block having a pocket formed therein for receiving a preset tool; right angular locating surfaces forming walls of said pocket; a preset tool in said pocket, said tool having a shank with a cutting tip at one end; a bolt threaded into a threaded hole in the end of said shank opposite that supporting said cutting tip; a tapered gib longitudinally adjustably fixed on one side of said shank; a recess having a cam surface within another side of said shank; a cam member in said block adapted to be received within said cam recess for forcing said preset tool along two axes and in a direction such that said bolt and said tapered gib engage said right angular locating surfaces; shoe means resiliently held within said pocket and adapted to rest on a side of said shank; and screw means adapted to cooperate with said shoe means to rigidly hold said tool within said pocket.

No references cited.

WILLIAM W. DYER, Jr., *Primary Examiner.*

LEONIDAS VLACHOS, *Examiner.*